(12) United States Patent
Khurgin et al.

(10) Patent No.: US 9,507,238 B2
(45) Date of Patent: Nov. 29, 2016

(54) LINEARIZED BRAGG GRATING ASSISTED ELECTRO-OPTIC MODULATOR

(71) Applicants: Jacob Khurgin, Pikesville, MD (US); Paul A. Morton, West Friendship, MD (US)

(72) Inventors: Jacob Khurgin, Pikesville, MD (US); Paul A. Morton, West Friendship, MD (US)

(73) Assignee: Morton Photonics, West Friendship, MD (US)

( * ) Notice: Subject to any disclaimer, the term of this patent is extended or adjusted under 35 U.S.C. 154(b) by 0 days.

(21) Appl. No.: 14/831,071

(22) Filed: Aug. 20, 2015

(65) Prior Publication Data

US 2016/0054640 A1    Feb. 25, 2016

Related U.S. Application Data

(60) Provisional application No. 62/039,994, filed on Aug. 21, 2014.

(51) Int. Cl.
*G02F 1/225* (2006.01)
*G02F 1/21* (2006.01)

(52) U.S. Cl.
CPC .......... *G02F 1/2257* (2013.01); *G02F 1/2255* (2013.01); *G02F 2001/215* (2013.01)

(58) Field of Classification Search
None
See application file for complete search history.

(56) References Cited

U.S. PATENT DOCUMENTS

| 6,212,002 B1* | 4/2001 | Lin | H01S 5/026 359/337 |
| 2002/0119400 A1* | 8/2002 | Jain | G02B 6/29322 430/321 |
| 2003/0152385 A1* | 8/2003 | Eldada | G02B 6/12004 398/34 |
| 2005/0196092 A1* | 9/2005 | Enokihara | G02F 1/2255 385/2 |
| 2011/0103734 A1* | 5/2011 | Akiyama | G02F 1/2255 385/2 |
| 2012/0002978 A1* | 1/2012 | Healey | G02F 1/225 398/183 |

* cited by examiner

*Primary Examiner* — Mike Stahl
(74) *Attorney, Agent, or Firm* — Nadya Reingand (57) ABSTRACT

The invention provides a new linearized electro-optic modulator in which linearization is achieved by modulating the index of a Bragg grating reflector placed in the arm(s) of a Michelson Interferometer. This grating-assisted Michelson Interferometer (GAMI) modulator operates as either an intensity or amplitude modulator, and is shown to significantly improve the linearity of microwave photonics links. Furthermore, this modulator improves the performance of optical communication systems using advanced modulation formats.

15 Claims, 7 Drawing Sheets

LINEARIZED BRAGG GRATING ASSISTED ELECTRO-OPTIC MODULATOR

CROSS-REFERENCE TO RELATED APPLICATIONS

This patent application claims priority to the U.S. provisional patent application No. 62/039,994 filed on Aug. 21, 2014.

STATEMENT REGARDING FEDERAL SPONSORED RESEARCH AND DEVELOPMENT

This invention was made with U.S. Government support under Contract W91CRB-10-C-0099 as part of the DARPA MTO STTR Project 'Miniature Silicon WDM Modulators for Analog Fiber-Optics Links', and the U.S. Government has certain rights in the invention.

FIELD OF INVENTION

The invention relates to high performance optical communication systems and analog photonics systems.

BACKGROUND

Figure 1:
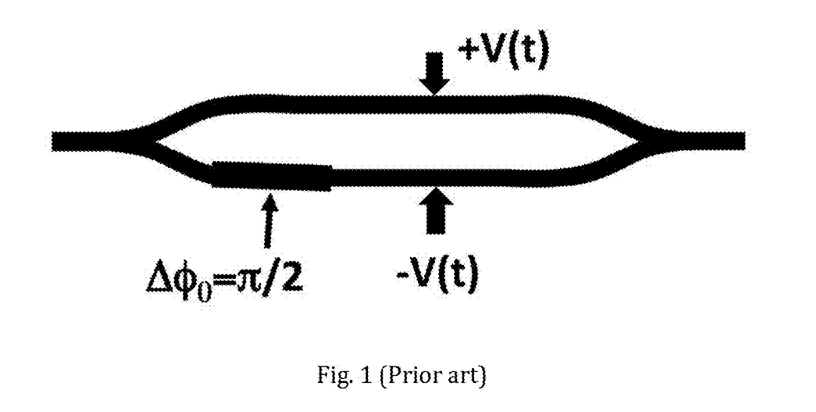
FIG. 1 shows a waveguide Mach Zehnder Interferometer intensity modulator (Prior art).
Figure 2:
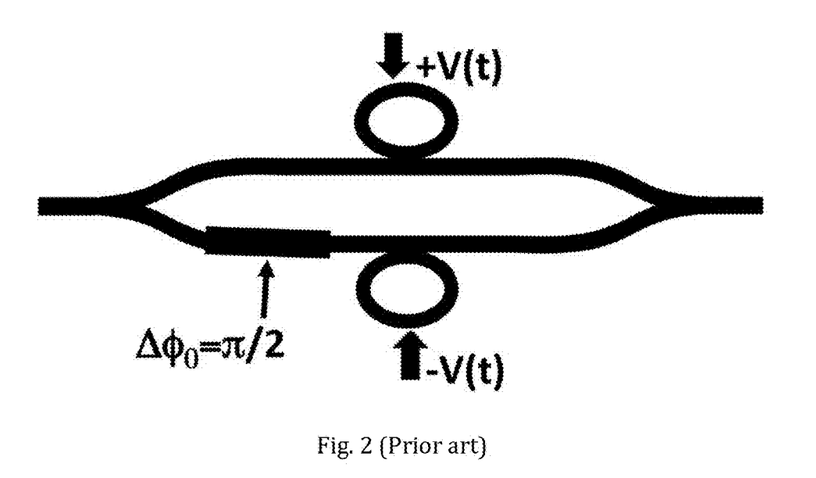
FIG. 2 shows a linearized Ring-Assisted Mach Zehnder Interferometer (RAMZI) intensity modulator (Prior art).

Modern analog photonics links require efficient methods of analog modulation with high linearity, commonly defined as high spurious free dynamic range (SFDR). Typically modulation is achieved using either electro-absorption modulators (EAM) in which just as the name implies the absorption coefficient of the device is modulated by the electric field, or electro-optic modulators (EOM) in which the refractive index is modulated and the ensuing phase modulation is converted into optical intensity modulation using an interference scheme, typically a Mach-Zehnder Interferometer (MZI), as shown in FIG. 1. While either EAM or MZI based modulators work very well for digital signals, where linearity is of less concern, the inherent nonlinearity of the modulation characteristics of both modulators reduce the dynamic range of analog photonics links. There have been numerous schemes for linearization of modulators, involving both electronic and optical means and multiple modulators, but their complexity prevents them from being widely used in practical applications. More recently, a relatively simple all-optical linearization scheme for MZI based modulators has been proposed, e.g. see, X. Xie et al, 'Linearized Mach-Zehnder intensity modulator', IEEE Photonics Technology Letters, 15(4): pages 531-533, 2003. Linearization was achieved using ring resonators coupled to one or both arms of the MZI. This scheme, the ring-assisted MZI (RAMZI) modulator, shown in FIG. 2, relies on the inherent nonlinearity of the phase transfer characteristics of the ring resonator. When a ring resonator is tuned to anti-resonance its phase modulation characteristics become super-linear (positive 3rd derivative) and the nonlinearity of the MZI modulator, which is sub-linear (negative 3rd derivative), is cancelled, with higher order cancellation requiring more separately driven rings. Cancellation of the third and higher odd order distortion in the transfer characteristics of modulator is the goal of every linearization scheme, including the present one.

The capacity of modern high speed optical communication networks is currently limited by the bandwidth in the telecommunication bands, roughly a few Terahertz. Using the simple on-off keying (OOK) modulation format the capacity of a single fiber thus cannot exceed a few Terabits per second. Currently, long range communication networks are moving to coherent modulation formats that involves altering the phase of the signal. Using the quadrature phase shift keying (QPSK) modulation format with two polarizations increases capacity by a factor of 4. In order to increase the capacity even further one must use more advanced so-called "coherent" modulator formats, such as optical OFDM (orthogonal frequency division multiplexing) and/or multilevel Quadrature Amplitude Modulation (QAM). The higher the level of multilevel modulation, the higher the spectral efficiency (bits/Hz) of the link. However, high levels of multilevel modulation require higher linearity of amplitude modulation; which current modulators do not provide.

There is a need for an increase in the linearity of optical modulators in order to overcome current limitations in performance of analog photonics links and radar technology, to increase the SFDR of such links and systems. In addition, there is a need for linearized modulation techniques in digital multi-level modulation formats, such as OFDM and QAM, in order to increase spectral efficiency of digital optical communication links.

SUMMARY

The present invention is a new approach for all-optical linearization of optical modulators. This new technique takes advantage of the super-linear phase response of a Bragg reflector to linearize the sub-linear phase response of the MZI. A key feature of the proposed Grating-Assisted Michelson Interferometer (GAMI) modulator scheme is that in principle it can cancel the nonlinearity to arbitrarily high order without using additional elements. The GAMI modulator can be operated to provide both highly linearized intensity modulation and also highly linearized amplitude modulation. The design can be implemented in different material systems, including those that are unsuitable for the fabrication of the RAMZI modulator.

The novel GAMI modulator is based on a Michelson interferometer with an optical amplitude divider having four ports; two serving as optical input and output, and two forming interferometric arms which are terminated by Bragg gratings. The Bragg gratings are made from a material whose refractive index is variable upon applying a time variable electrical signal. Depending on the applied signal as well as additional phase shift in the interferometric arm, a variety of modulators are proposed.

DESCRIPTION OF THE INVENTION

Figure 3:
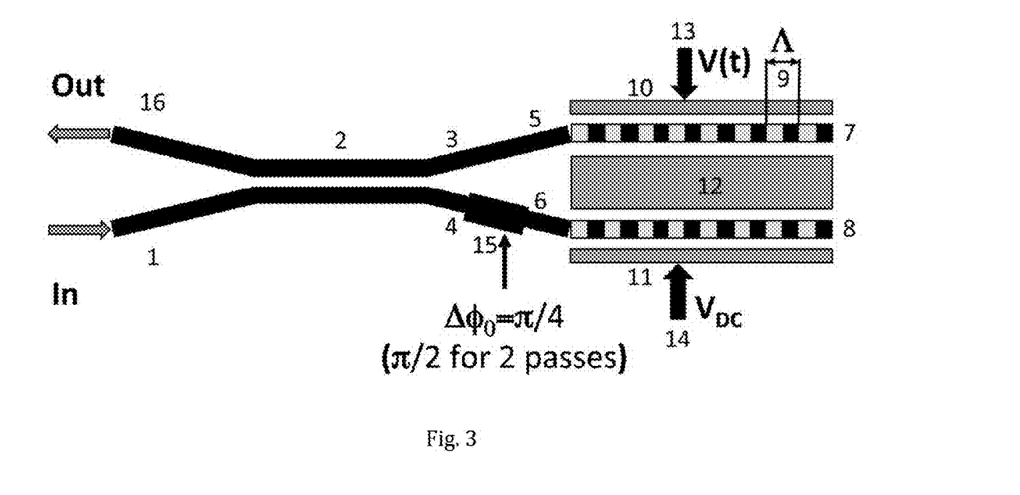
FIG. 3 shows a waveguide Grating-Assisted Michelson Interferometer (GAMI) intensity modulator.

The proposed linearized Grating-Assisted Michelson Interferometer (GAMI) modulator is shown in FIG. 3. The input optical signal typically coming from an external laser source is entering through an optical input port (1) of the waveguide 3 dB directional coupler (2) that splits it equally between two ports (3,4) connected to interferometric arms (5,6) with Bragg grating reflectors (7,8) placed in each arm. The Bragg grating consists of alternating waveguide segments with different propagation constants; typically this is achieved by modulating either the height or width of the waveguide. The period of the grating (9) is Λ. For use as an intensity modulator, the index of one grating is modulated by applying an electrical signal V(t) (13), while the other grating is controlled by a DC signal, $V_{DC}$ (14), which is used to balance the first arm, i.e. having the same reflectivity. The voltages are applied via two electrodes, (10,11) and the common electrode (12) is grounded. In addition, there is a phase-shifting section (15) incorporated into one of the arms that provides an additional phase shift between the two arms, equal to a round trip phase shift of 90 degrees. When the phase shift is 90 degrees the modulator is considered biased to the quadrature point. This phase shift can be achieved by varying the temperature of the waveguide using a heater. The Bragg grating is made from a material in which the index of refraction can be modulated when the voltage V is modulated. This index modulation can be achieved via the Pockels (electro-optic) effect in a material such as lithium niobate, by carrier depletion in silicon, or by the quantum confined Stark effect (QCSE) in InP. The optical signals reflected from the Bragg gratings enter the coupler and emerge from the output port (16).

The complete GAMI modulator can be made of silicon, using standard silicon photonics CMOS foundry processes, with silicon waveguides and Bragg gratings formed in the two interferometric arms, plus silicon P-N junction phase modulators created on each grating. Alternatively, the complete device could be fabricated in III-V material, such as InP based, to allow direct monolithic integration with InP based lasers and other devices, forming a more complex monolithic photonic integrated circuit (PIC). A final, and potentially the preferred approach, is to use a silicon photonics foundry that supports heterogeneous integration of III-V phase modulation sections; this approach takes advantage of low loss silicon waveguides, the high precision silicon coupler and grating structures provided by CMOS foundry processes, together with the higher efficiency and lower nonlinearity III-V phase modulation sections. The heterogeneous integrated silicon photonics foundry allows for the fabrication of complex PIC devices using optimum materials for each component, allowing seamless integration of high performance lasers, linearized modulators, filters, multiplexers/demultiplexers, and detectors. The silicon photonics approach also supports the integration of complex electronics on the same PIC.

Figure 4:
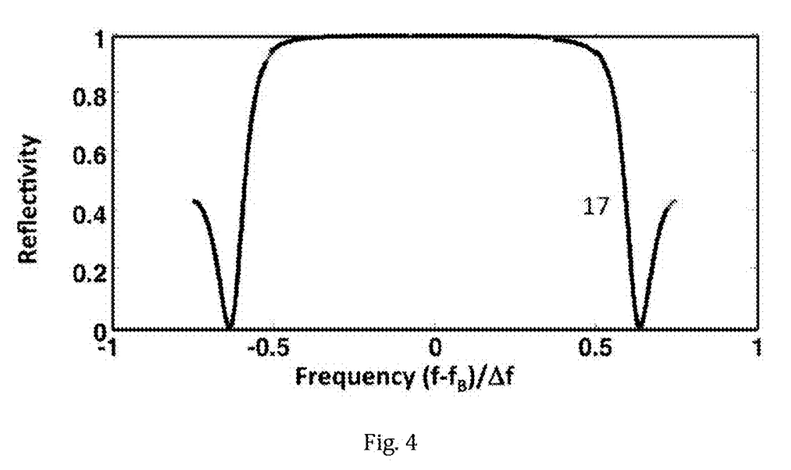
FIG. 4 shows the reflectivity spectrum of the waveguide Bragg grating.

Let us now describe the operational principle of the linearized GAMI modulator. The operational optical frequency is the Bragg frequency $f_B = c/2\Lambda\bar{n}_{eff}$ where Λ is the grating period and $\bar{n}_{eff}$ is the effective index of the waveguide. The coupling coefficient of the grating is $\kappa \approx 2(f_B/c)\delta n$, where δn is the effective index modulation depth achieved by varying waveguide width or thickness. Following the analysis described by Yariv and Nakamura, "Periodic structures for integrated optics", IEEE J. of Quantum Electronics, QE-13, (4) pages 233-252 (1977), we can obtain the complex reflectivity $r(f)=|r(f)|e^{i\Delta\phi(f)}$ of the grating. The reflection coefficient $R(f)=|r(f)|^2$ (17) is plotted in FIG. 4 for κL=3. High reflectivity occurs in a region where detuning from the Bragg frequency $|\delta f|=|f-f_B|\leq \Delta f/2$, where the high reflectivity bandwidth is $$\Delta f = \frac{c\kappa}{\pi n_{eff}} = \frac{2f_B \delta n}{\pi \bar{n}_{eff}} \quad (1)$$

Figure 5:
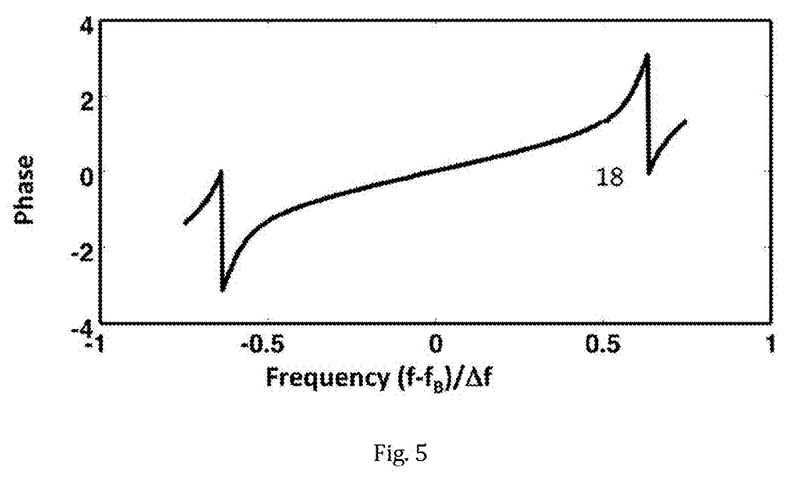
FIG. 5 shows the spectrum of the phase of the light reflected by the waveguide Bragg grating

As the length of grating increases, i.e. κL→∞ the reflectivity approaches 100% within Δf. The phase response of the reflected light, Δϕ(f) (18), is shown in FIG. 5. As can be seen, the response is clearly superlinear, and, moreover, for long gratings with κL→∞ it becomes $$\Delta\phi(f)=\sin^{-1}(2\delta f/\Delta f), \quad (2)$$

which is precisely the inverse sine characteristic required for perfect cancellation of the Michelson interferometer nonlinearity. Realistically, good linearization is achieved for κL≥3

If the effective index of the grating is modulated using the electro-optic effect, carrier depletion, or Quantum confined Stark effect, as $n_{eff}(t)=\bar{n}_{eff}+r_{eff}V(t)$ where $r_{eff}=(\partial n_{eff}/\partial V)$ is the index modulation efficiency, the Bragg frequency and therefore detuning δf also becomes modulated in time as $\delta f(t)=-f_B r_{eff}V(t)/\bar{n}_{eff}=\Delta f V(t)/2V_\pi$, where the half-wave voltage is $$V_\pi = \Delta f \bar{n}_{eff}/2f_B r_{eff} \quad (3)$$

The expression for the output power of the quadrature-biased GAMI intensity modulator is then $$P_{out}(t) = \frac{P_{in}}{4}\left|1 + \frac{\tanh\left(\kappa L\sqrt{1-(V/V_\pi)^2}\right)}{j\sqrt{1-(V/V_\pi)^2} + V/V_\pi \tanh\left(\kappa L\sqrt{1-(V/V_\pi)^2}\right)}\right|^2 \quad (4)$$

which at κL→∞ becomes $P_{out}(t)=\frac{1}{2}P_{in}(1+V/V_\pi)$ i.e. perfectly linearized.

Figure 6:
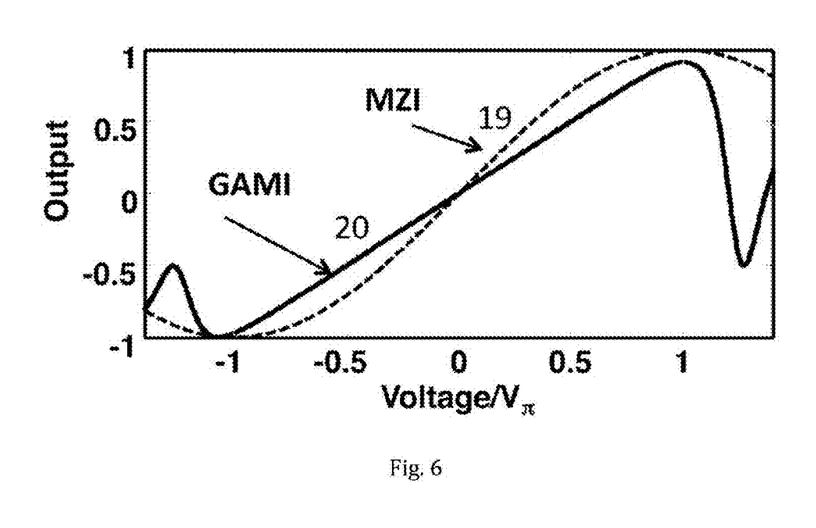
FIG. 6 shows the input/output characteristics of both MZI and GAMI intensity modulators.

Let us now perform a simple analysis of the performance of the linearized intensity GAMI. FIG. 6 shows the output characteristics of a simple MZI modulator (19) and the GAMI modulator (20) with κL=3; clearly the GAMI modulator characteristic is more linear.

Figure 7:
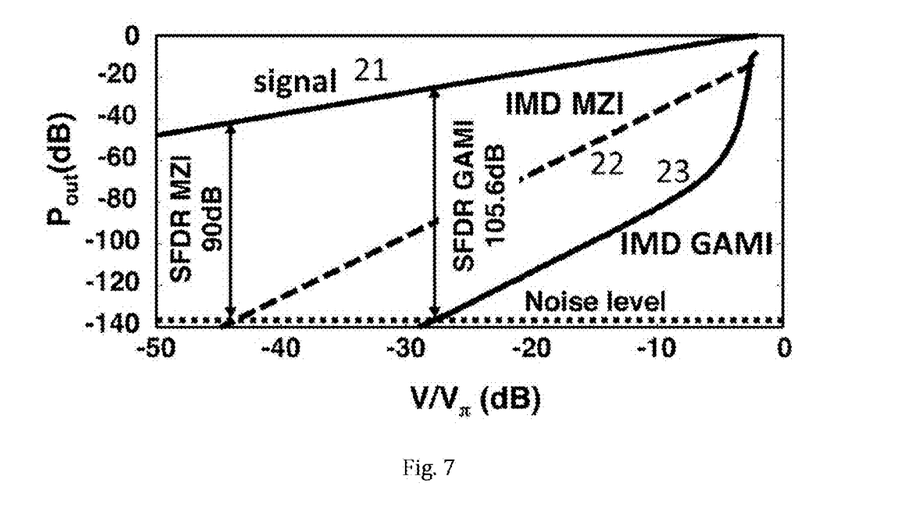
FIG. 7 shows the SFDR of both MZI and GAMI intensity modulators.

For analog links the most important characteristic is the spur free dynamic range (SFDR); equal to the ratio (in dB) of the output signal level and third order intermodulation distortion (IMD) level (22). In FIG. 7 the signal level (21) and IMD curves for the standard MZI modulator (22) and GAMI modulator (23) are shown. The IMD level for the GAMI modulator is lower, and the SFDR increases by about 15 dB.

Figure 8:
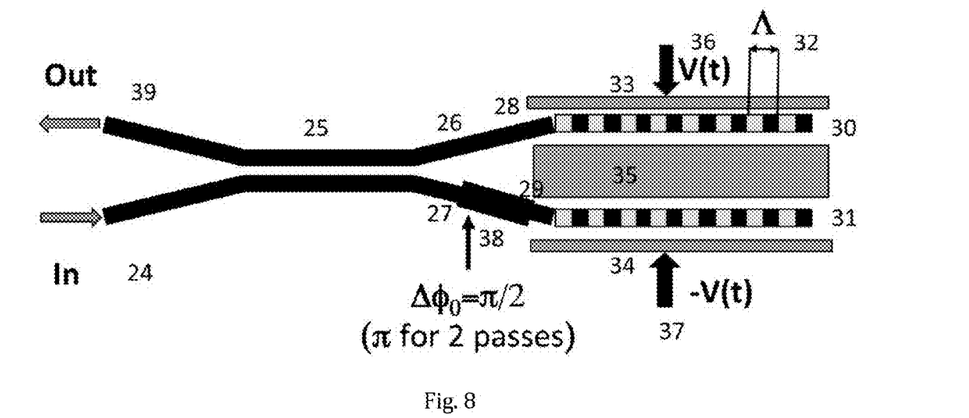
FIG. 8 shows a waveguide Grating-Assisted Michelson Interferometer (GAMI) amplitude modulator.

In addition to being used as intensity modulator, the GAMI modulator can also be used as an amplitude (of optical field) modulator for use in coherent photonic links. As shown in FIG. 8, the amplitude modulator differs from the intensity modulator of FIG. 3 in two important aspects. Firstly, the round trip phase shift between the two arms (28) and (29) provided by the phase shifter (38) is 180 degrees, in order to make sure that the amplitude of light is zero when no bias is applied to the electrodes. Secondly, the modulator is driven in a push-pull configuration, with signal voltages (36) and (37) of equal amplitude and opposite signs applied to electrodes (33) and (34) respectively.

Figure 9:
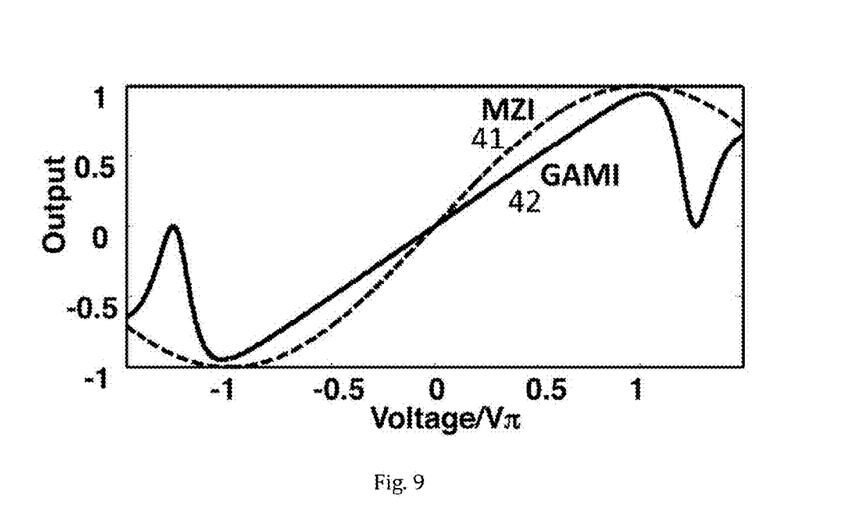
FIG. 9 shows the input/output characteristics of both MZI and GAMI amplitude modulators.
Figure 10:
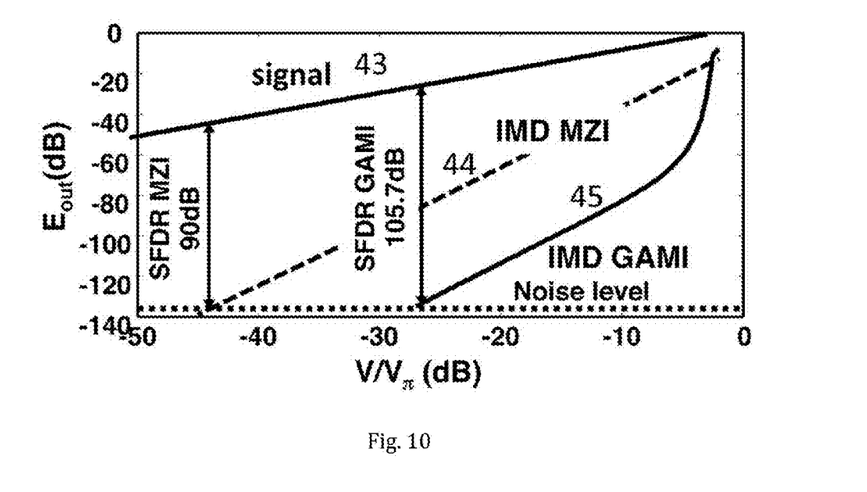
FIG. 10 shows the SFDR of both MZI and GAMI amplitude modulators.

As shown in FIG. 9, the output characteristics of GAMI amplitude modulator (42) is more linear than that of an MZI when operated as an amplitude modulator (41). FIG. 10 shows that the SFDR of the GAMI amplitude modulator is about 16 dB higher than that of MZI amplitude modulator.

Figure 11:
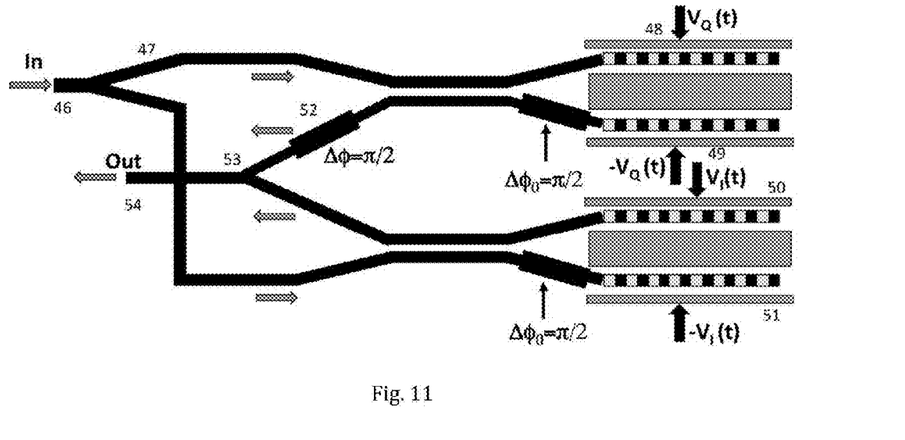
FIG. 11 shows a Quadrature GAMI modulator for use in OFDM and QAM communication links.

The GAMI modulator can also be used to perform modulation of both the amplitude and phase of an optical carrier signal for application in modern high spectral efficiency modulation formats of optical communications, such as OFDM (orthogonal frequency division multiplexing) and QAM (quadrature amplitude modulation). As shown in FIG. 11, two GAMI amplitude modulators can be combined to modulate the input optical carrier signal [46]. First the light is split at a divider (47) into two equal parts. The first half of the input optical signal is modulated in the top GAMI amplitude modulator by the "quadrature" electric signal $V_Q(t)$, and its inverse signal $-V_Q(t)$, which are applied to the first [48] and second [49] electrodes of the first GAMI. The second half of input optical signal is modulated in the lower GAMI amplitude modulator by the "in-phase" electric signal, with $V_I(t)$ and its inverse $-V_I(t)$ applied to the first [50] and second [51] electrodes of the second GAMI modulator. The phase-shifter (52) introduces an additional 90 degrees phase shift between the optical outputs of the two GAMI amplitude modulators, that are then combined at the combiner (52), producing an optical output (54) that is modulated in both phase and amplitude.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical modulator, comprising:
a Michelson interferometer having an optical amplitude divider having four ports; a first port being an optical input; a second and a third port being connected to a first and a second interferometric arms; the fourth port being an optical output;
at least one of the interferometric arms is terminated by a first Bragg grating;
the first Bragg grating is made from a material whose refractive index is variable upon applying a time variable electrical signal; and
a first pair of electrodes applying the time variable electrical signal to the first Bragg grating, further comprising
a phase shifter applying a phase shift in one of the arms, the phase shifter introduces a 90-degrees round trip phase shift; thus the modulator producing an intensity modulated optical signal.

2. The optical modulator of claim 1, wherein the optical input is CW signal.

3. The optical modulator of claim 1, wherein the optical input is optically modulated signal.

4. The optical modulator of claim 1, wherein the amplitude divider is a coupler.

5. The optical modulator of claim 1, further comprising a second Bragg grating in one of the said interferometric arms; the second Bragg grating being the same as the first Bragg grating; and a second pair of electrodes applying a second electrical signal to the second Bragg grating.

6. The optical modulator of claim 5, wherein one electrode is common for both gratings.

7. The optical modulator of claim 5, the modulator producing an intensity modulated optical signal by applying electrical signal to the first pair of electrodes; applying a DC signal to the second pair of electrodes; and the phase shifter introduces a 90-degrees round trip phase shift.

8. The optical modulator of claim 5, the modulator producing an amplitude modulated optical signal by applying electrical signal to the first pair of electrodes; applying the same, but inverted signal to the second pair of electrodes; and the phase shifter introduces a 180-degrees round trip phase shift.

9. The modulator of claim 8, wherein the modulator is made on a silicon substrate.

10. The modulator of claim 9, wherein the gratings are made from InP.

11. An optical phase and amplitude modulator, comprising:
a first divider splitting incoming laser radiation into an I and a Q optical inputs;
a first Michelson interferometer having a second optical amplitude divider having four ports; a first port being the Q input; a second and a third port being connected to a first and a second interferometric arms; the fourth port being a Q output;
said first interferometric arm is terminated by a first Bragg grating;
said second interferometric arm is terminated by a second Bragg grating;
a first phase shifter introducing 180 degrees round trip phase shift in the second arm;
a second Michelson interferometer having a third optical amplitude divider having four ports; a fifth port being the I input; a sixth and a seventh port being connected to a third and a fourth interferometric arms; the eighth port being an I output;
said third interferometric arm is terminated by a third Bragg grating;
said fourth interferometric arm is terminated by a fourth Bragg grating;
all Bragg gratings are made from a material whose refractive index is variable upon applying a time variable electrical signal;
a second phase shifter introducing 180 degrees round trip phase shift in the fourth arm;
a third phase shifter introducing 90 degrees phase shift in the Q output;
a combiner combining the I and the Q outputs thus outputting a phase and amplitude modulated optical signal, wherein
a first time variable Q electrical signal is applied to a first pair of electrodes changing a refractive index of the first Bragg grating;
a second time variable (−Q) electrical signal which is an inverted first Q electrical signal is applied to a second pair of electrodes changing a refractive index of the second Bragg grating;
a third time variable I electrical signal is applied to a third pair of electrodes changing a refractive index of the third Bragg grating;
a fourth time variable (−I) electrical signal which is an inverted third I electrical signal is applied to a fourth pair of electrodes changing a refractive index of the fourth Bragg grating.

12. The modulator of claim 11, wherein the output optical signal is a QAM signal.

13. The modulator of claim 11, wherein the output optical signal is an OFDM signal.

14. The modulator of claim 11, wherein all dividers are 50/50 dividers.

15. The modulator of claim 11, wherein all dividers are tunable.

* * * * *